United States Patent [19]

McElfish et al.

[11] Patent Number: 4,568,117

[45] Date of Patent: Feb. 4, 1986

[54] STORAGE TURNTABLE FOR VEHICLE

[75] Inventors: Donald C. McElfish, Warren; Frederick L. Colombo, Fraser; Brian J. Worrell, Mt. Clemens, all of Mich.

[73] Assignee: General Motors Corporation, Detroit, Mich.

[21] Appl. No.: 655,107

[22] Filed: Sep. 27, 1984

[51] Int. Cl.$^4$ ............................ B60R 7/04; B60N 3/10
[52] U.S. Cl. .................... 296/37.8; 296/37.14; 224/280; 312/21; 312/248
[58] Field of Search ............... 296/37.1, 37.8, 37.14, 296/37.9; 220/206.81; 224/280, 278, 275; 108/62; 312/21, 327, 328, 329, 248; 105/325

[56] References Cited

U.S. PATENT DOCUMENTS

| 2,248,276 | 7/1941 | LeTourneau | 108/62 |
| 2,970,005 | 1/1961 | Schillinger | 312/327 |
| 3,177,033 | 4/1965 | Daniels | 312/323 |

FOREIGN PATENT DOCUMENTS 616110  1/1949  United Kingdom ................. 312/329

Primary Examiner—Randolph A. Reese
Assistant Examiner—Carol L. Olson
Attorney, Agent, or Firm—Charles E. Leahy

[57] ABSTRACT

A storage turntable is comprised of a prism having spaced apart polygonal ends connected by a plurality of rectangular sides. Each of the sides provides a desired storage accessory such as a beverage container receptacle or a coin storage device. One side of the turntable is a plain planar surface which merely closes the opening. The console has a rectangular opening and the turntable is rotatably mounted within the opening by axles which extend from the polygonal ends of the prism and are rotatably journaled in bearing blocks attached to the console housing so that rotary movement of the prism sequentially registers a desired one of the storage accessories with the console opening for access by the vehicle occupant. A round thumb wheel is attached to the prism and extends above the surface of the console to provide a convenient means by which the turntable can be rotated. A detent is provided to retain the turntable at the selected position. The detent preferably includes a spring loaded button carried by the housing and riding against the end face of the thumb wheel to extend within one of a plurality of circumferentially spaced conical depressions to hold the turntable at a selected position.

5 Claims, 6 Drawing Figures

STORAGE TURNTABLE FOR VEHICLE

The invention relates to a storage turntable for a vehicle body and more particularly, a storage turntable mounted in the console between the seats.

BACKGROUND OF THE INVENTION

It is well known in motor vehicle bodies to provide storage accessories by which the vehicle occupant can facilitate the storage and use of items such as coins for parking meters, combs, cassette tapes, facial tissues, etc. In the prior art, such storage accessories have been variously provided on the sunshade, in the glove compartment door and on a console located between the driver and passenger seats. For example it is well known to provide a circular depression in the horizontal surface of the console to receive a beverage container such as a cup, bottle or can. Futhermore, it is well known to provide a coin storage device which holds parking meter change such as quarters, nickles and dimes. Various door arrangements have been used to conceal these storage accessories from view.

It would be desirable to provide such prior known storage accessories in a manner by which the console space devoted to such accessories is minimized and the vehicle occupant has convenient access to any one of a number of such storage accessories.

SUMMARY OF THE INVENTION

According to the present invention, a storage accessory is provided by a storage turntable comprising a prism having spaced apart polygonal ends connected by a plurality of rectangular sides. The rectangular sides carry or are shaped to provide a desired storage accessory such as a beverage container receptacle or a coin storage device. One side of the prism is preferably a planar surface having a surface finish the same as the surface of the vehicle console and merely function to close the opening. The console has a rectangular opening and the prism is rotatably mounted within the opening by axles which extend from the polygonal ends of the prism and are rotatably journaled in bearing blocks attached to the console housing so that rotary movement of the prism sequentially registers a desired one of the storage accessories with the console opening for access by the vehicle occupant. A round thumb wheel is preferably attached to the prism and extends above the surface of the console to provide a convenient means by which the turntable can be rotated by the vehicle occupant. Furthermore, a detent is provided to retain the turntable at the selected position. The detent preferably includes a spring loaded button carried by the housing and riding against the end face of the thumb wheel to extend within one of a plurality of circumferentially spaced depressions in the thumb wheel to hold the turntable at a selected position.

Accordingly, the object, feature and advantage of the invention resides in the provision of a plurality of storage accessories carried upon rectangular sides of a prismatic turntable which is rotatably mounted within an opening of the vehicle console to sequentially display the storage accessories within the console opening upon rotary movement of the turntable.

A further object, feature and advantage resides in the provision of a plurality of storage accessories carried upon the rectangular sides of a prismatic-shaped rotatably-mounted turntable having associated thumbwheel for rotating the turntable between various use positions and a detent for holding the turntable at a selected position.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
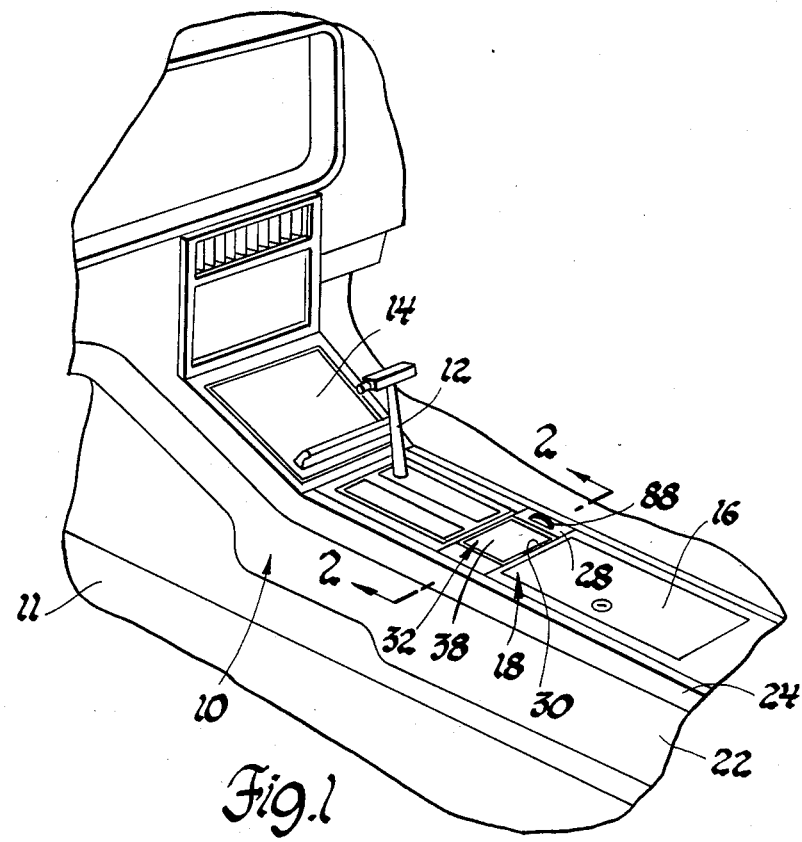
FIG. 1 is a perspective view of a vehicle body console having a storage turntable according to the invention.

Referring to FIG. 1 there is seen a vehicle body console generally indicated at 10. The console is mounted on the vehicle floor between the passenger and driver seats in a vehicle body 11. The transmission shift selector 12 extends through the console. Other items provided by the console are an ash tray beneath the door 14 and a storage compartment beneath the door 16. The present invention relates to a storage turntable generally indicated at 18.

Figure 2:
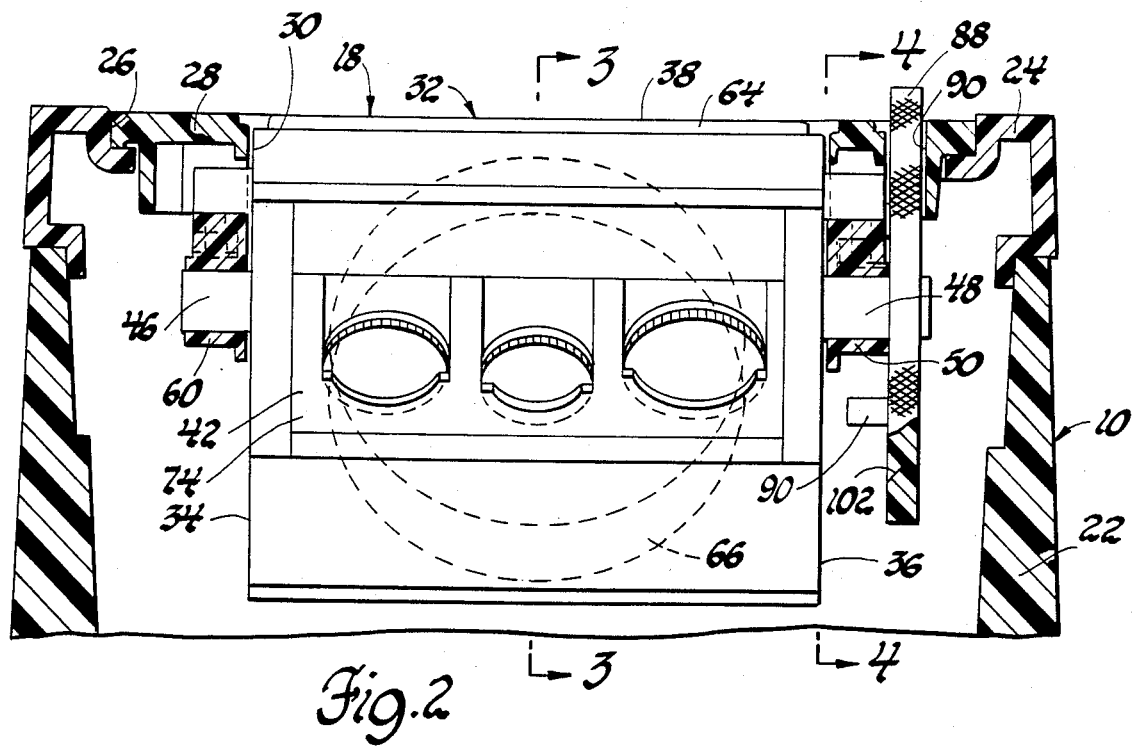
FIG. 2 is a sectional view through the storage turntable taken in the direction of arrows 2—2 of FIG. 1.
Figure 4:
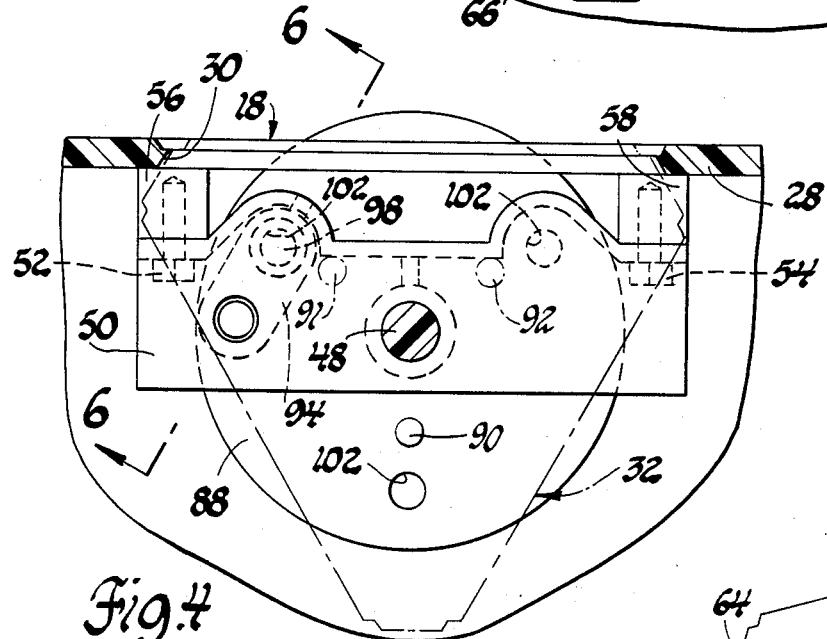
FIG. 4 is a sectional view taken in the direction of arrows 4—4 of FIG. 2.

Referring to FIG. 2 it is seen that the console 10 includes a base housing 22 mounted on the vehicle floor and a console cover 24 having a rectangular flanged opening 26 in the horizontal top surface thereof. The storage turntable 18 fits within the flanged opening 26 and includes a perimeter frame 28 having a rectangular opening 30 in which a turntable prism 32 is mounted. The turntable prism 32 is a triangular prism having triangular end faces 34 and 36 and rectangular sides 38, 40 and 42. As best seen in FIG. 2, axles 46 and 48 extend respectively from the triangular end faces 34 and 36. As best seen in FIGS. 2 and 4, the axle 48 is rotatably journaled within a journal block 50 mounted on the underside of the perimeter frame 28 by a pair of screws 52 and 54 which are threaded into attaching blocks 56 and 58 molded integrally with the perimeter frame 28. A similar journal block 60 receives the axle 46 and is mounted on the underside of the perimeter frame 28 by screws.

The rectangular side 38 of the turntable 18 is a decorative planar closeout panel 64 which does not provide a storage function but instead closes the rectangular opening 30.

Figure 3:
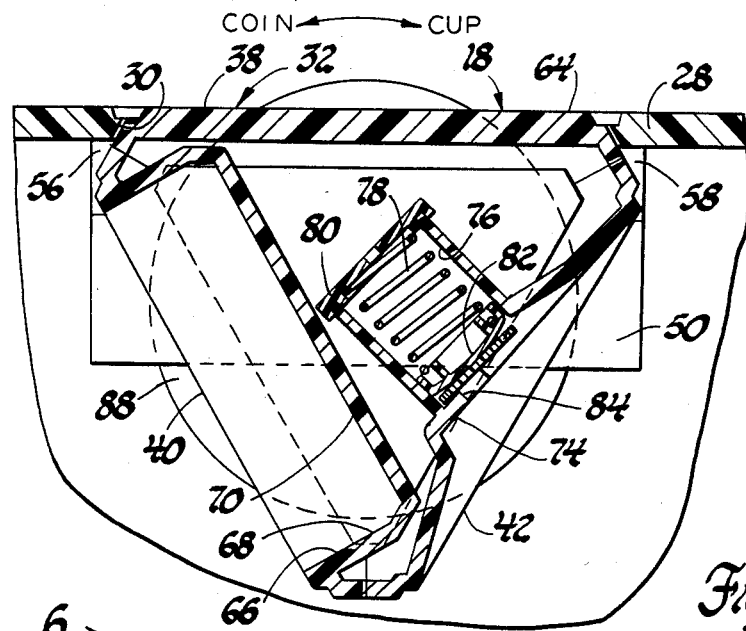
FIG. 3 is a sectional view taken in the direction of arrows 3—3 of FIG. 2.

The side 40 of the turntable prism 32 has a beverage container receptacle 66 defined by a circular vertical wall 68 and a bottom wall 70. As best seen in FIG. 3, rotary movement of the turntable 120° in the clockwise direction would register the side 40 of the turntable prism 32 with the opening 30 so that the beverage receptacle 66 would be poised to receive a cup, can or bottle.

Side 42 of the turntable prism 32 carries a coinholder 74 which, as seen in FIG. 2, stores a variety of coins such as nickles, dimes and quarters. As best seen in FIG. 3 the dime holder is typical of each of the coin holders and includes a cylindrical well 76 and a coil compression spring 78 acting between the bottom 80 of the well and a button 82. Coins are stored between the spring loaded button 82 and a lip 84 molded integrally at the outer edge of the well 76. As best seen in FIG. 3, counterclockwise rotary movement of the turntable 120° in the direction of rotation registers the side 42 of the turntable 18 with the opening 30 so that the operator has access to the coinholder 74.

As best seen in FIGS. 2 and 3, a thumb wheel 88 is attached to the axle 48 for unitary rotation therewith and extends through an access slot 90 in the perimeter frame 28. The outer circumferential surface of the thumb wheel 88 is knurled to provide a thumb grip surface by which the occupant can conveniently index the turntable 18 through its various rotary positions.

As best seen in FIGS. 2 and 4, a stop 90 is formed integrally with the thumb wheel 88. Rotary movement of the turntable 120° in the clockwise direction carries the stop 90 into engagement with the journal block 50 as shown at phantom line position 91 to stop further turntable rotation in the clockwise direction. It is desirable to prevent such further rotary movement because it has been found that attempting to rotate clockwise from the receptacle 66 position to the coinholder 74 position causes the then upside down coinholder to accelerate clockwise relative the coins with the result that the resting momentum of the coins can cause the coins to fall from the coinholder. Likewise, rotary movement 120° in the counterclockwise direction carries the stop 90 into engagment with the journal block 50 as shown at phantom line position 92 to stop further rotation in the counterclockwise direction. A label may be mounted on the perimeter frame to indicate the direction of rotation which will respectively deploy the receptacle and the coinholder.

Figure 6:
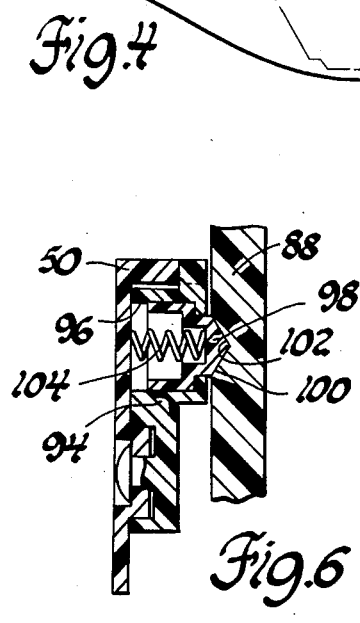
FIG. 6 is a sectional view taken in the direction of arrows 6—6 of FIG. 4 showing a detent for holding the turntable at a desired rotary position.
Figure 5:
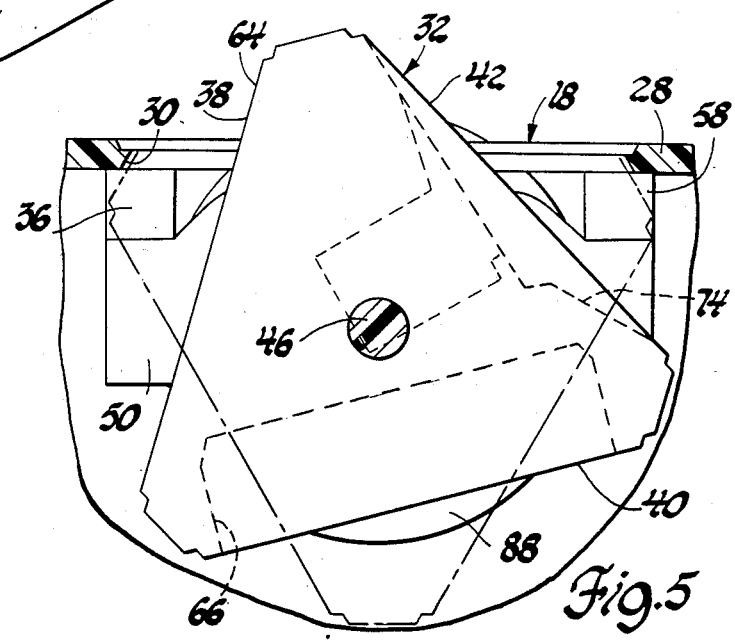
FIG. 5 is an end view of the storage turntable showing its movement during rotation between use positions.

As best seen in FIGS. 4 and 6, a detent arrangement is provided to maintain the turntable 18 at its selected use position. As best seen in FIG. 6, the journal block 50 carries a molded plastic bracket 94 having a bore 96 in which a plunger 98 is movable. The plunger 98 has a conical end face 100 which is seated in a conical bore 102 provided in the face of the thumb wheel 88. A spring 104 urges the plunger 98 into constant engagement with the face of the thumb wheel 88. The thumb wheel 88 has three conical depressions spaced circumferentially equidistant from one another and positioned to receive the conical point 100 so that the turntable is detented at the selected use position.

Thus it is seen that the invention provides a new and improved storage compartment for motor vehicle console and comprising a rotary mounted prism having various storage accessories mounted on the sides thereof. Although the turntable disclosed herein is a triangular prism, it will be understood that the turntable could be a quadrilateral prism and it will also be understood that storage accessories could be provided for combs, maps, tissues, cassette cartriges, etc. Furthermore, the rotary turntable could be mounted on the instrument panel or elsewhere in the vehicle body.

The embodiments of the invention in which an exclusive property of privilege is claimed are defined as follows:

1. A multi-use storage device for a motor vehicle comprising:

a housing mounted on the vehicle body adjacent the occupant and having a horizontal surface with a rectangular opening therein;

a prismatic turntable having a pair of polygonal ends connected by a plurality of rectangular sides adapted to provide desired storage accessories;

and means mounting said prismatic turntable in said housing for rotation about an axis extending through the center of said polygonal ends whereby a selected one of said storage accessories is sequentially registered with the opening in the housing in response to rotation of the turntable about said axis.

2. A multi-use storage device for a motor vehicle comprising:

a console mounted in the vehicle body and having a horizontal surface with a rectangular opening therein;

a rectangular perimeter frame adapted to fit within the opening of the console housing and defining a rectangular opening therein;

a prism shaped turntable having a pair of polygonal ends connected by a plurality of rectangular sides;

article storage means carried by one or more of the rectangular sides of the turntable; and rotary mounting means acting between the polygonal ends of the turntable and the perimeter frame to mount the turntable in a concealed relationship beneath the horizontal surface of the console with a selected one of the rectangular sides registered with the rectangular opening of the perimeter frame and enabling rotation of the prism to sequentially register the desired one of the article storage means with the opening in response to rotation of the turntable.

3. A multi-use storage device for a motor vehicle comprising:

a housing mounted on the vehicle body adjacent the occupant and having a horizontal surface with a rectangular opening therein;

a prismatic turntable having a pair of polygonal ends connected by a plurality of rectangular sides adapted to provide desired storage accessories;

means mounting said prismatic turntable in said housing for rotation about an axis extending through the center of said polygonal ends whereby a selected one of said storage accessories is sequentially registered with the opening in the housing in response to rotation of the turntable about said axis; and a thumb wheel connected with the prismatic turntable for unitary rotation therewith and extending through the opening in the housing for access by the vehicle occupant to enable rotary movement of the turntable by rotating the thumb wheel.

4. A multi-use storage device for a motor vehicle comprising:

a housing mounted on the vehicle body adjacent the occupant and having a horizontal surface with a rectangular opening therein;

a prismatic turntable having a pair of polygonal ends connected by a plurality of rectangular sides adapted to provide desired storage accessories;

means mounting said prismatic turntable in said housing for rotation about an axis extending through the center of said polygonal ends whereby a selected one of said storage accessories is sequentially registered with the opening in the housing in response to rotation of the turntable about said axis; and detent means acting between the housing and the turntable to releasably retain the turntable at a rotary position establishing the selected one of said storage accessories in registered alignment with the opening in the housing.

5. A multi-use storage device for a motor vehicle comprising:
- a console mounted in the vehicle body and having a horizontal surface with a rectangular opening therein;
- a rectangular perimeter frame adapted to fit within the opening of the console housing and defining a rectangular opening therein;
- a prism shaped turntable having a pair of polygonal ends connected by a plurality of rectangular sides;
- storage means carried by one or more of the rectangular sides of the turntable;
- rotary mounting means acting between the polygonal ends of the turntable and the perimeter frame to mount the turntable in a concealed relationship beneath the horizontal surface of the console with a selected one of the rectangular sides registered with the rectangular opening of the perimeter frame and enabling rotation of the prism to sequentially register a selected other one of the storage accessories with the opening in response to rotation of the turntable;
- a thumb wheel attached to the turntable for unitary rotation therewith and extending through the perimeter frame for access by the vehicle occupant to effect rotary movement of the turntable by rotating the thumb wheel; and
- detent means acting between the turntable and the perimeter frame to detent the turntable at the selected one of its use positions.

* * * * *